US008831186B2

(12) United States Patent
Schultz et al.

(10) Patent No.: US 8,831,186 B2
(45) Date of Patent: *Sep. 9, 2014

(54) SYSTEMS AND METHODS FOR GATHERING INFORMATION

(75) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 407 days.

This patent is subject to a terminal disclaimer.

(21) Appl. No.: 12/962,295

(22) Filed: Dec. 7, 2010

(65) Prior Publication Data
US 2011/0075827 A1 Mar. 31, 2011

Related U.S. Application Data

(63) Continuation of application No. 10/900,331, filed on Jul. 28, 2004, now Pat. No. 7,873,149, which is a continuation-in-part of application No. 10/857,446, filed on Jun. 1, 2004, now Pat. No. 8,392,193.

(60) Provisional application No. 60/584,123, filed on Jul. 1, 2004.

(51) Int. Cl.
H04M 1/64 (2006.01)
G10L 15/10 (2006.01)
H04M 3/42 (2006.01)

(52) U.S. Cl.
CPC ............... *H04M 3/42* (2013.01); *G10L 15/10* (2013.01); *H04M 3/42042* (2013.01); *H04M 3/42068* (2013.01)
USPC .................... 379/88.23; 379/70; 379/167.08; 704/275

(58) Field of Classification Search
USPC .......................... 379/67.1, 76, 88.01–88.02, 379/88.19–88.21, 88.23, 88.24, 167.08, 70; 705/16; 704/275
See application file for complete search history.

(56) References Cited

U.S. PATENT DOCUMENTS

| | | | |
|---|---|---|---|
| 4,958,368 A | 9/1990 | Parker | |
| 5,146,487 A | 9/1992 | Bergsman et al. | |
| 5,829,000 A | 10/1998 | Huang et al. | |
| 5,867,562 A | 2/1999 | Scherer | |
| 6,016,336 A | 1/2000 | Hanson | |
| 6,058,364 A | 5/2000 | Goldberg et al. | |
| 6,061,654 A | 5/2000 | Brown et al. | |
| 6,122,612 A | 9/2000 | Goldbert | |
| 6,122,615 A | 9/2000 | Yamamoto | |
| 6,223,156 B1 | 4/2001 | Goldberg et al. | |
| 6,292,799 B1 | 9/2001 | Peek et al. | |
| 6,373,939 B1 | 4/2002 | Reese et al. | |
| 6,459,782 B1 | 10/2002 | Bedrosian et al. | |
| 6,598,019 B1 | 7/2003 | Tokuda et al. | |
| 7,035,867 B2 | 4/2006 | Thompson et al. | |

(Continued)

OTHER PUBLICATIONS

"What is a VIN Number," Oct. 2000, http://web.archive.org/web/20001017235211/http://www.nsxprime.com/FAQ/General/vin.html.

*Primary Examiner* — Md S Elahee

(57) ABSTRACT

A method for retrieving information may include receiving a telephone call from a caller and identifying a telephone number from which the telephone call was made. The method may also include retrieving information from a database based on the identified telephone number. The method may further include providing an audible message to the caller to verify whether the retrieved information is correct.

20 Claims, 4 Drawing Sheets

(56) References Cited

U.S. PATENT DOCUMENTS

| | | |
|---|---|---|
| 7,042,989 B2 | 5/2006 | Lawson et al. |
| 7,046,777 B2 | 5/2006 | Colson et al. |
| 7,143,039 B1 | 11/2006 | Stifelman |
| 7,240,002 B2 | 7/2007 | Minamino et al. |
| 2002/0013705 A1 | 1/2002 | Jaepel et al. |
| 2002/0037073 A1 | 3/2002 | Reese et al. |
| 2003/0081744 A1 | 5/2003 | Gurfein et al. |
| 2003/0191639 A1 | 10/2003 | Mazza |
| 2003/0228007 A1 | 12/2003 | Kurosaki |
| 2004/0071275 A1 | 4/2004 | Bowater et al. |
| 2004/0190687 A1 | 9/2004 | Baker |
| 2004/0198461 A1 | 10/2004 | Coombes |
| 2005/0100144 A1 | 5/2005 | O'Connor |
| 2005/0137868 A1 | 6/2005 | Epstein et al. |
| 2005/0149328 A1 | 7/2005 | Huang et al. |
| 2005/0177442 A1* | 8/2005 | Sullivan et al. ............... 705/26 |
| 2005/0233735 A1 | 10/2005 | Karaoguz et al. |
| 2005/0267748 A1 | 12/2005 | Wilkes et al. |

* cited by examiner

SYSTEMS AND METHODS FOR GATHERING INFORMATION

RELATED APPLICATIONS

This application is a continuation of U.S. patent application Ser. No. 10/900,331, filed Jul. 28, 2004, which is a continuation-in-part of U.S. patent application Ser. No. 10/857,446, filed Jun. 1, 2004, the disclosures of which are hereby incorporated herein by reference. This application claims priority under 35 U.S.C. §119 based on U.S. Provisional Application Ser. No. 60/584,123, filed Jul. 1, 2004, the disclosure of which is also hereby incorporated herein by reference.

FIELD OF THE INVENTION

Implementations consistent with the invention relate generally to gathering information and, more particularly, to leveraging existing information when servicing requests.

BACKGROUND OF THE INVENTION

Conventional speech recognition systems attempt to convert speech from a user into text that represents the words that were actually spoken by the user. Such speech recognition systems typically suffer from a number of problems and are relatively inaccurate. That is, conventional speech recognition systems are often unable to determine what was spoken, incorrectly determine what was spoken or require significant dialog with the user in order to determine what was spoken. These problems limit the usefulness of automated systems that utilize speech recognition systems, such as automated systems servicing telephone calls.

SUMMARY OF THE INVENTION

According to one aspect of the invention, a method for retrieving information is provided. The method includes receiving a telephone call from a caller and identifying a telephone number from which the telephone call was made. The method also includes retrieving information from a database based on the identified telephone number and providing an audible message to the caller to verify whether the retrieved information is correct.

According to another aspect of the invention, a system including a receive device and logic is provided. The receive device is configured to receive a telephone call from a caller and the logic is configured to determine a telephone number from which the telephone call was made. The logic is also configured to retrieve information from a first database based on the telephone number, where the retrieved information includes at least one of an address or a name. The logic is further configured to provide an audible message to the caller to verify whether the retrieved information is correct.

Another aspect of the invention provides a method that includes receiving a telephone call. The method also includes retrieving first information based on a telephone number from which the telephone call was placed. The method further includes determining whether the first information is associated with a caller that placed the telephone call.

Still another aspect of the invention provides a method that includes retrieving first information from a first database. The method also includes receiving a voice input from a user and generating a speech recognition result corresponding to the voice input using the first information.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

Figure 1:
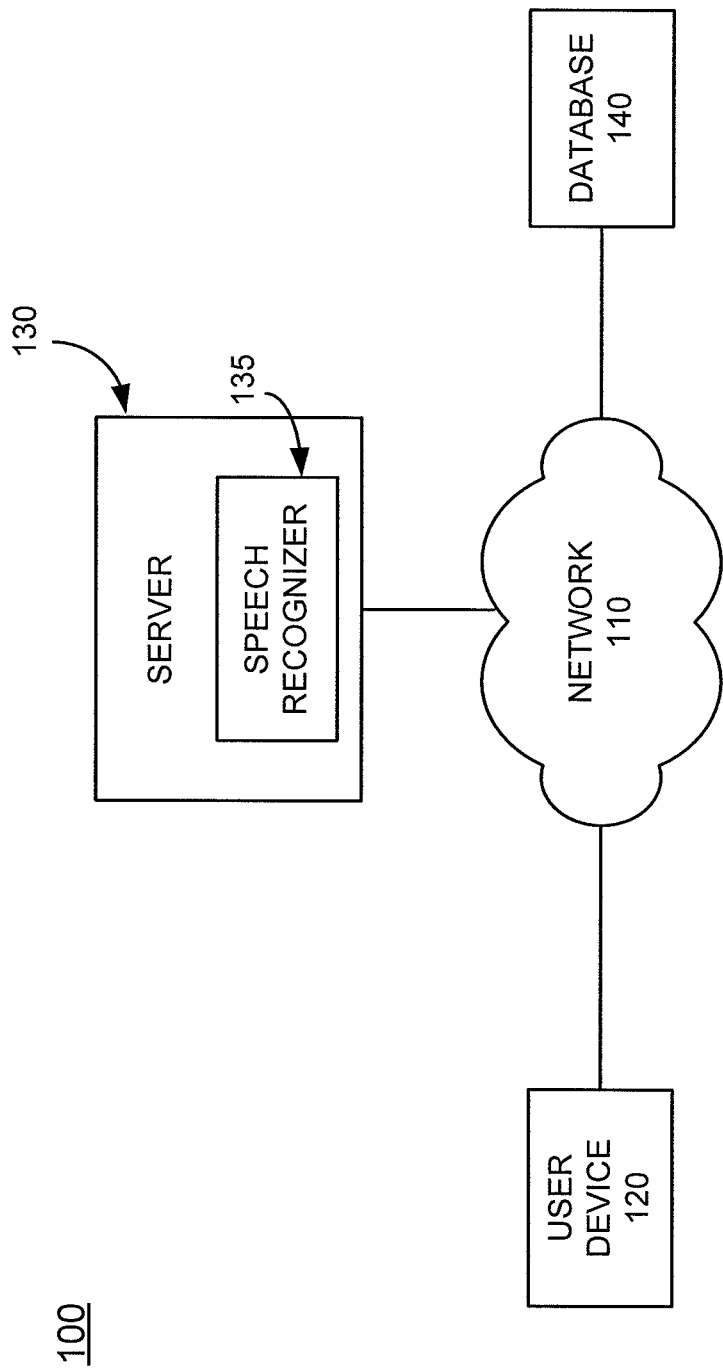
FIG. 1 is a block diagram of an exemplary system in which methods and systems consistent with the invention may be implemented.

FIG. 1 is a block diagram of an exemplary system 100 in which methods and systems consistent with the invention may be implemented. System 100 may include network 110, user device 120, server 130 and database 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Network 110 may include any type of network, such as a local area network (LAN), a wide area network (WAN), a public telephone network (e.g., the public switched telephone network (PSTN)), a wireless network, a virtual private network (VPN), the Internet, an intranet, or a combination of networks. The connections shown in FIG. 1 may be wired, wireless and/or optical connections.

Network 110 may further include one or more devices, such as a network gateway, that allow divergent transport networks to communicate and cooperatively carry traffic. The network gateway may also adapt analog or pulse code modulation (PCM) encoded voice signals to a packetized data stream suitable for transport over network 110.

User device 120 may include any type of conventional telephone that is used to place and receive telephone calls. For example, user device 120 may be a standard telephone, a cordless telephone, a cellular telephone or any other type of conventional telephone.

User device 120 may also include any type of device that is capable of transmitting and receiving voice signals to/from a network. For example, user device 120 may include any client device, such as a personal computer (PC), a laptop computer, a personal digital assistant (PDA), a web-based appliance, etc., that is configured to provide telephone functions and is able to transmit/receive voice signals via network 110. User device 120 may, for example, be a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Server 130 may include any server and/or computing device that is able to connect to network 110 and transmit and receive information via network 110. Server 130 may also include a telephone device (not shown) that interfaces with network 110 to receive and/or place telephone calls and an automated system that services telephone calls. For example, server 130 may be associated with an entity that services literature requests, such as requests for product catalogs, requests for consumer or government-related publications, or requests for any other information. In alternative implementations, server 130 may be associated with an entity that provides other services. In an exemplary implementation consistent with the invention, server 130 may include a speech recognizer 135 that performs speech recognition, as described in more detail below.

Figure 2:
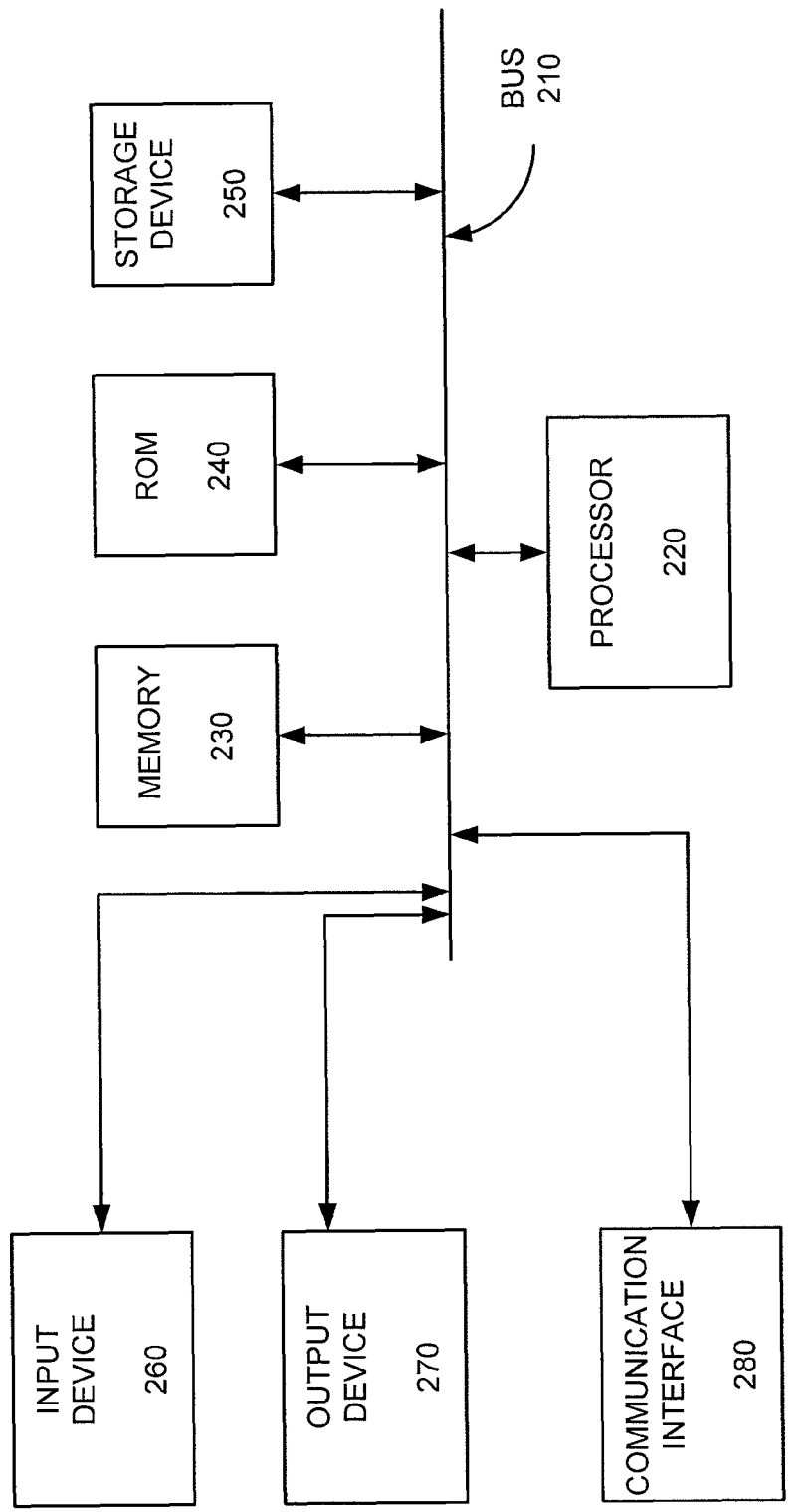
FIG. 2 is a block diagram illustrating an exemplary configuration of the server of FIG. 1 in an implementation consistent with the invention.

FIG. 2 illustrates an exemplary configuration of server 130 in an implementation consistent with the invention. Other configurations may alternatively be used. Server 130 may include a bus 210, a processor 220, a memory 230, a read only memory (ROM) 240, a storage device 250, an input device 260, an output device 270, and a communication interface 280. Bus 210 permits communication among the components of server 130.

Processor 220 may include any type of conventional processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to server 130, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables server 130 to communicate with other devices and/or systems. For example, communication interface 280 may include a modem or an Ethernet interface to a LAN. Alternatively, communication interface 280 may include other mechanisms for communicating via a network.

Server 130, consistent with the invention, may perform processing in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the invention. Thus, implementations consistent with the invention are not limited to any specific combination of hardware circuitry and software.

Referring back to FIG. 1, database 140 may include one or more memory devices that store data. In an exemplary implementation, database 140 may also include one or more processors, computers and/or servers that control access to database 140 and facilitate searching of database 140. These processor(s)/computer(s)/server(s) may be configured in a manner similar to server 130 illustrated in FIG. 2.

In one implementation, database 140 may store information, such as name and address information. For example, database 140 may be a directory assistance database that stores telephone numbers along with names, addresses and other information associated with each respective telephone number. In other implementations, database 140 may store other information based on the particular application.

Server 130 and database 140 are illustrated in FIG. 1 as being connected via network 110. In alternative implementations, server 130 and database 140 may be connected directly to each other, connected via a network separate from network 110, such as a private network, etc. In still other alternative implementations, the functions performed by server 130 and database 140, described in more detail below, may be performed by a single device/platform.

Figure 3:
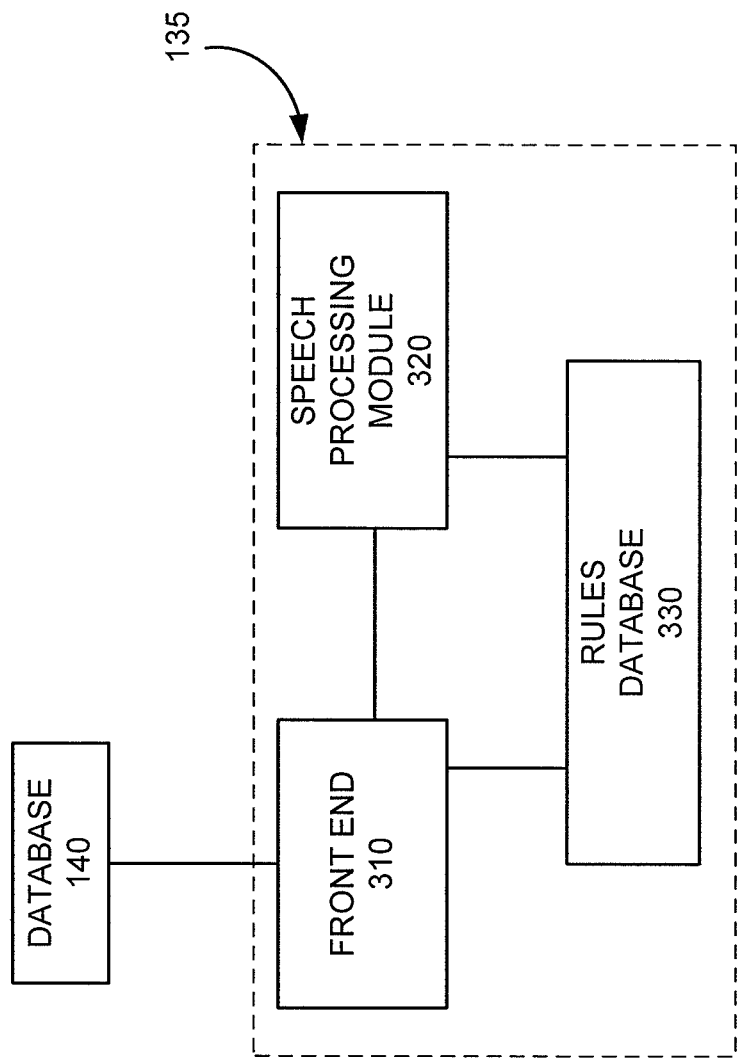
FIG. 3 is an exemplary functional block diagram of the speech recognizer of FIG. 1, consistent with the invention.

FIG. 3 is an exemplary functional block diagram of speech recognizer 135, according to an implementation consistent with the invention. The logical blocks illustrated in FIG. 3 may be implemented in software, hardware, or a combination of hardware and software. Speech recognizer 135 is illustrated in FIG. 1 as being implemented in server 130. It should be understood that speech recognizer 135 may be located externally from server 130 in other implementations.

Speech recognizer 135 may include a front end 310, a speech processing module 320 and a rules database 330. Front end 310 may include an automatic number identification (ANI) system that determines the telephone number associated with an incoming call. For example, front end 310 may receive an incoming call from user device 120 and determine the caller's telephone number upon call set-up. Front end 310 may also forward the caller's telephone number to database 140, where the caller's telephone number is used as an index to determine the caller's name and/or address.

Front end 310 may also access other databases (not shown) to retrieve additional information associated with the caller. In each case, the retrieved information may be forwarded to front end 310. Front end 310 may receive the retrieved information from database 140 and/or other databases and may use this information to assist in the gathering of information from the caller at user device 120.

Speech processing module 320 may perform speech recognition on voice data input from a caller. Speech processing module 320 may perform the speech recognition in accordance with rules or grammars stored in rules database 330.

Rules database 330 may store a number of rules or grammars associated with performing speech recognition. For example, a grammar may define a particular rule with respect to performing speech recognition. In an implementation consistent with the invention, the grammars stored in rules database 330 may be customized based on constraints associated with the subject of the speech recognition process.

Front end 310, as described above, may identify a telephone number of a caller using an ANI system. Front end 310 may also forward the caller's telephone number to, for example, database 140 to identify additional information associated with the caller. Database 140 may forward the additional information to front end 310. This information may enable server 130 to more efficiently assist callers, as described in more detail below.

Figure 4:
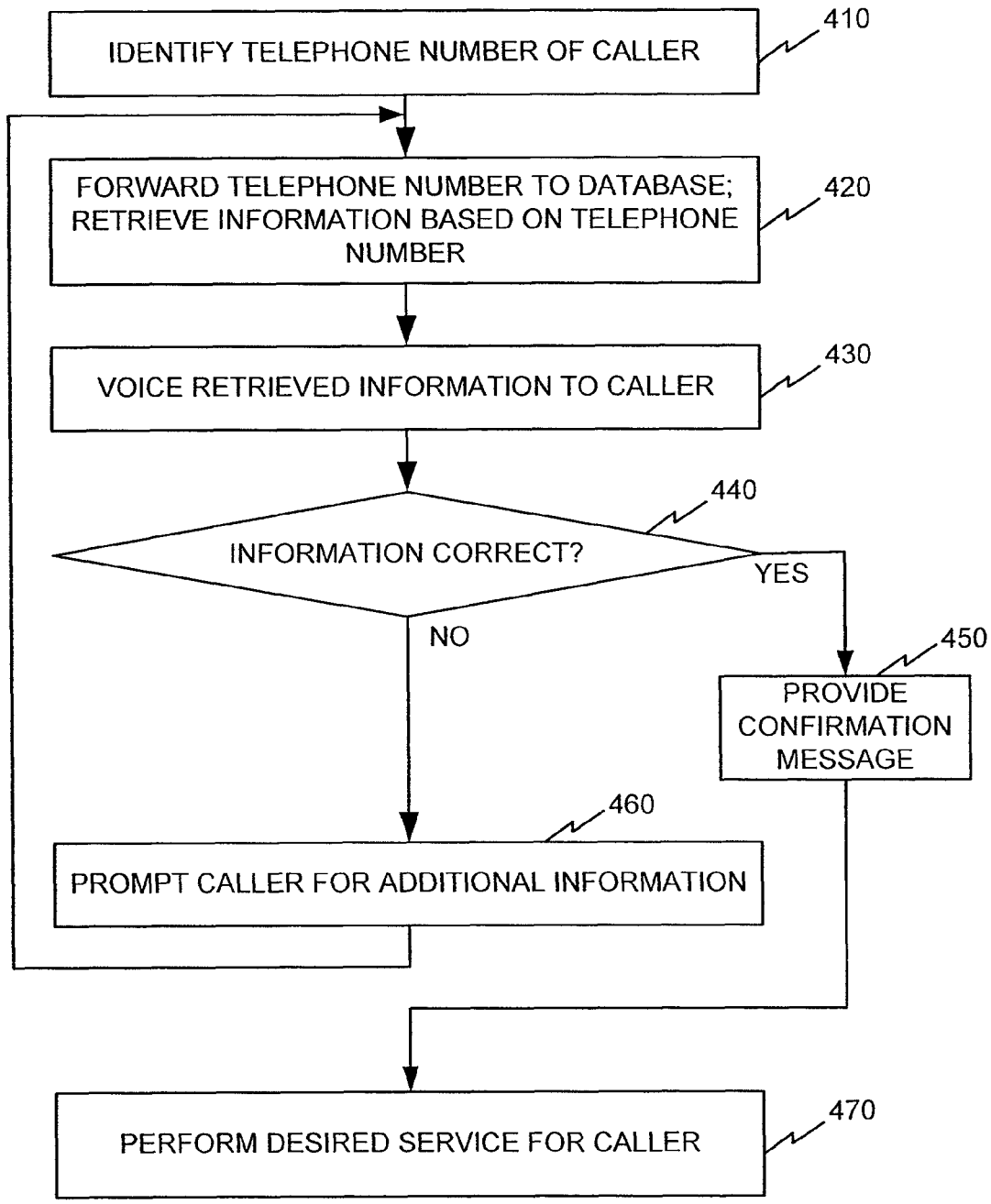
FIG. 4 is a flow diagram illustrating exemplary processing consistent with principles of the invention.

FIG. 4 is a flow diagram illustrating exemplary processing consistent with principles of the invention. Processing may begin with a caller establishing communications with server 130 via user device 120. For example, a caller at user device 120 may dial a telephone number associated with server 130 or enter an Internet address associated with server 130. Server 130, as described above, may include a telephone device (not shown) that is able to receive telephone calls. Alternatively, a telephone device not associated with server 130 may receive the call and forward the call to server 130.

Front end 310 may also identify a telephone number of the caller using an ANI system (act 410). For example, an ANI system associated with server 130 may provide the caller's telephone number to server 130 upon call set-up.

Front end 310 may also provide an automated greeting to the caller at user device 120. For example, front end 310 may provide a greeting, such as "You have reached Company X, if you wish to receive a copy of our catalog at your home address, press 1." Alternatively, front end 310 may provide a menu of options and request that the caller voice a selection. In this case, speech processing module 320 may determine the caller's selection. In still other alternatives, front end 310 may bypass this initial greeting until additional information has been gathered regarding the caller.

Front end 310, as discussed above, may also forward the caller's telephone number to database 140 to attempt to identify information associated with the caller (act 420). Database 140 may receive the caller's telephone number and use the caller's telephone number as an index to search database 140.

For example, as discussed above, assume that database 140 is a directory assistance database that stores telephone numbers along with names and addresses corresponding to the telephone numbers. In this case, database 140 may retrieve a name and an address associated with the caller's telephone number (act 420). Database 140 may return the results of the search, such as the name and address, to front end 310. Front end 310 may receive the information from database 140 and may use this information to assist in servicing the telephone call from the caller at user device 120.

For example, a text-to-speech converter included in or accessible by front end 310 may provide a voice greeting to the caller that includes the retrieved information (act 430). For example, the voice greeting may be, "Hello, You have reached the catalog request line for Company X. Is this Mr. Smith from 123 Main Street?" The caller may then answer yes or no. Alternatively, a human operator may voice the retrieved information to the caller to verify that the retrieved information is the correct information for that particular caller.

Speech recognizer 135 or the human operator may then determine whether the information voiced to the caller is correct (act 440). For example, speech recognizer 135 may determine whether the caller answered yes or no using speech processing module 320 and rules database 330. If the caller answered in the affirmative indicating that the name and address voiced to the caller are correct, front end 310 may provide another voice message to the caller confirming that the catalog will be sent to the caller (act 450). For example, front end 310 may provide a message, such as, "Mr. Smith, we will send you the requested catalog to your home address."

In the event that the caller answers that the name and address voiced to the caller are not correct, front end 310 may prompt the caller for additional information (act 460). For example, front end 310 may prompt the caller for his/her home telephone number by requesting that the caller either voice the telephone number or enter the telephone number via a keypad. If the caller voices the telephone number, speech processing module 320 may determine what the caller said and front end 310 may confirm with the caller the telephone number he/she voiced.

Processing may then return to act 420. That is, front end 310 may forward the caller's home telephone number to database 140 to retrieve the caller's name and home address. Front end 310 may then confirm whether the retrieved information associated with the caller is correct (acts 430 and 440). In some implementations consistent with the invention, the caller may be prompted to provide his/her home telephone number prior to the first search of database 140, such as upon the initial greeting. This may help server 130 avoid searching database 140 more than once, such as in situations where the caller is not placing the call from his/her home telephone.

After receiving confirmation that the voiced name and/or address are correct, server 130 may perform the desired service associated with the telephone call (act 470). For instance, in the example above, server 130 and/or a party affiliated with server 130 may send the desired product catalog to the caller at his/her home address.

In some implementations consistent with the invention, once front end 310 has received confirmation that the retrieved information is correct, front end 310 may engage the caller with additional questions based on the particular application. For example, if server 130 provides information to callers on more than one topic, front end 310 may provide a menu of selections associated with each particular topic and have the caller either voice a selection or press a number on a telephone keypad. Speech processing module 320 may then be used to determine the user's response using rules database 330 to facilitate the speech recognition process.

In addition, in some implementations consistent with the invention, speech processing module 320 may use the retrieved information as an aid when performing speech recognition. For example, some of the information retrieved from database 140 may be information that a caller may be required to voice, such as his/her name and/or address. In this case, speech processing module 320 may use the retrieved information to weight potential results of the speech recognition process.

For example, assume that front end 310 requests that the caller voice his/her name and address. Further assume that speech processing module 320 is having a difficult time determining whether the caller voiced 70 Main Street or 17 Main Street. In this case, if front end 310 has retrieved 70 Main Street from database 140 as the caller's likely address, speech processing module 320 may determine that the most likely voice input is 70 Main Street and may weight that result accordingly. Front end 310 may then verify that the caller's address is 70 Main Street.

In other instances, the retrieved information may be used to verify that the caller is who he/she claims to be. For example, the retrieved information may include a date of birth, a personal identification number (PIN), or other information known to the caller. In each case, speech processing module 320 may use the retrieved information as an aid in performing speech recognition on voice input from the caller, thereby yielding more accurate speech recognition results.

In another implementation consistent with the invention, once a caller's name and address have been verified, server 130 may use this information to retrieve additional information regarding the caller. For example, in a commercial application, such as an application involving a retailer, front end 310 may retrieve information regarding the caller's account. In this case, if the caller wishes to retrieve information regarding his/her account, the caller may voice the request. Speech processing module 320 may then use the retrieved information regarding the caller's account to help determine the caller's request. For example, if the caller is requesting the status of an order or wishes to determine an outstanding balance for a bill, speech processing module 320 may determine that the most likely voice input is associated with the retrieved information for that caller and may weight what was voiced using the retrieved information as an aid.

As another example, assume that the application executed by server 130 involves allowing the caller to purchase a product. In this case, front end 310 may automatically access a credit bureau's database using the caller's name and/or address to determine whether the caller has a good credit history. If the credit history is not good, server 130 may require that the caller purchase the product using a credit card as opposed to being billed at a later time.

CONCLUSION

Systems and methods consistent with the invention provide an enhanced process for servicing requests by leverage existing content. This allows for faster processing of the requests and streamlines any dialog that may be needed when servicing the requests. In addition, aspects consistent with the invention may also leverage existing data to facilitate a speech recognition process to further streamline processing of the requests.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, implementations consistent with the principles of the invention have been described mainly with the example of retrieving name and address information based on an identified telephone number from a caller. It should be understood that implementations consistent with the principles of the invention may retrieve information from any existing database based on the particular application and leverage the retrieved information to provide the desired service. For example, implementations consistent with principles of the invention may retrieve information associated with motor vehicles and may allow a caller to, for example, renew his/her vehicle registration over the telephone, request an address change, etc. Other implementations may retrieve a caller's banking information to facilitate various banking functions, retrieve credit card related information to facilitate credit card related functions, etc. In each case, the retrieved information may be used to streamline processing associated with servicing the particular request. It should also be understood that implementations consistent with principles of the invention may not involve servicing requests made via telephone, but may involve any system that leverages existing data to service a request.

Lastly, a series of acts has been described with respect to FIG. 4. The order of the acts may be varied in other implementations consistent with the invention. Moreover, non-dependent acts may be performed in parallel. Further, the invention is not limited to any specific combination of hardware circuitry and/or software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device comprising:
a memory to store instructions; and
a processor to execute the instructions to:
retrieve information, from the memory, based on a telephone number associated with a call,
the information being retrieved independent of information obtained from querying a user associated with the call, and
the telephone number being identified independent of the information obtained from querying the user,
provide, to the user, a portion of the retrieved information,
receive an input from the user based on providing the portion of the retrieved information,
determine, based on the received input, whether the portion of the retrieved information is correct,
cause an action, associated with the call, to be performed when the portion of the retrieved information is correct,
prompt the user for additional information when the portion of the retrieved information is not correct,
the additional information including a different telephone number associated with the user,
receive the additional information, including the different telephone number, from the user after prompting the user,
retrieve other information, from the memory, based on the additional information that includes the different telephone number,
provide, to the user, a portion of the retrieved other information,
receive another input from the user based on providing the portion of the retrieved other information, and
cause the action to be performed when the other input indicates that the portion of the retrieved other information is correct.

2. The device of claim 1, where the processor is further to:
request information from the user when the portion of the retrieved information is correct,
receive additional input from the user based on requesting the information,
obtain a speech recognition result based on the received additional input, and
provide information to the user based on the obtained speech recognition result.

3. The device of claim 1, where the processor is further to:
obtain a speech recognition result based on additional input received from the user,
compare the obtained speech recognition result with another portion of the retrieved information,
where the other portion of the retrieved information includes identification information associated with the user, and
verify the identification information associated with the user after comparing the obtained speech recognition result with the other portion of the retrieved information.

4. The device of claim 1, where, when causing the action to be performed, the processor is further to:
retrieve, based on the portion of the information, additional information as retrieved additional information when the portion of the retrieved information is correct, and provide a portion of the retrieved additional information to the user.

5. The device of claim 4, where the processor is further to:
receive additional input from the user when the retrieved additional information is retrieved, and
obtain a speech recognition result based on the additional input,
where the portion of the retrieved additional information is provided to the user based on the obtained speech recognition result.

6. The device of claim 1, where the processor is further to:
receive additional input from the user,
generate a plurality of speech recognition results based on the additional input, and
weight each of the plurality of speech recognition results, based on a match between a second portion of the retrieved information and a respective one of the plurality of speech recognition results, to obtain a weight of each of the plurality of speech recognition results.

7. The device of claim 6, where the processor is further to:
determine that the additional input corresponds to a particular speech recognition result, of the plurality of speech recognition results, based on the weight of the particular speech recognition result,
verify, based on the particular speech recognition result, that the second portion of the retrieved information is correct, and
cause another action associated with the call to be performed when the second portion of the retrieved information is correct.

8. The device of claim 1, where, when causing the action to be performed, the processor is further to:
receive information from the user; and
cause the retrieved information to be updated based on the received information.

9. The device of claim 1, where the processor is further to:
receive particular information from the user; and
cause the retrieved information to be updated based on the received particular information.

10. A method comprising:
retrieving, by a device and from a memory, information based on a telephone number associated with a call,
the information being retrieved independent of information obtained from querying a user associated with the call,
the telephone number being identified independent of the information obtained from querying the user;
providing, by the device and to the user, a portion of the retrieved information;
receiving, by the device, an input from the user based on providing the portion of the retrieved information;
determining, by the device and based on the received input, whether the portion of the retrieved information is accurate;
performing, by the device, an action associated with the call when the portion of the retrieved information is accurate;
prompting, by the device, the user for additional information when the portion of the retrieved information is not accurate;
the additional information including a different telephone number associated with the user,
receiving, by the device and from the user after prompting the user, the additional information including the different telephone number;
retrieving, by the device and from the memory, other information based on the additional information that includes the different telephone number;
providing, by the device and to the user, a portion of the retrieved other information;
receiving, by the device, another input from the user based on providing the portion of the retrieved other information; and
performing, by the device, the action when the other input indicates that the portion of the retrieved other information is accurate.

11. The method of claim 10, further comprising:
receiving the call,
where retrieving the information includes:
retrieving the information based only on the telephone number associated with the call.

12. The method of claim 10, further comprising:
retrieving additional information;
receiving additional input from the user;
obtaining a plurality of speech recognition results based on the received additional input; and
providing a portion of the retrieved additional information to the user based on a particular speech recognition result of the plurality of speech recognition results.

13. The method of claim 12, further comprising:
weighting each of the plurality of speech recognition results, based on the portion of the retrieved additional information, to obtain a weight of each of the plurality of speech recognition results; and
determining that the additional input corresponds to the particular speech recognition result based on the weight of the particular speech recognition result,
where providing the portion of the retrieved additional information includes:
providing the portion of the retrieved additional information to the user after determining that the additional input corresponds to the particular speech recognition result.

14. The method of claim 10, further comprising:
determining that the portion of the retrieved information is not accurate,
where retrieving the other information includes:
retrieving the other information using the different telephone number.

15. The method of claim 10, further comprising:
receiving information from the user when the portion of the retrieved information is accurate,
where performing the action includes:
updating the retrieved information based on the information received from the user.

16. A non-transitory computer-readable medium storing instructions, the instructions comprising:
one or more instructions which, when executed by a device, cause the device to search a memory based only on a telephone number associated with a call,
the telephone number being identified independent of information obtained from querying a user associated with the call;
one or more instructions which, when executed by the device, cause the device to retrieve information based on a result of searching the memory based only on the telephone number;
one or more instructions which, when executed by the device, cause the device to provide, to the user, a portion of the retrieved information;

one or more instructions which, when executed by the device, cause the device to receive an input from the user based on providing the portion of the retrieved information;

one or more instructions which, when executed by the device, cause the device to determine, based on the received input, whether the portion of the retrieved information is accurate;

one or more instructions which, when executed by the device, cause the device to cause an action associated with the call to be performed when the portion of the retrieved information is accurate;

one or more instructions which, when executed by the device, cause the device to prompt the user for a different telephone number associated with the user when the portion of the retrieved information is not accurate;

one or more instructions which, when executed by the device, cause the device to receive the different telephone number from the user after prompting the user;

one or more instructions which, when executed by the device, cause the device to retrieve other information, from the memory, based on the different telephone number;

one or more instructions which, when executed by the device, cause the device to provide, to the user, a portion of the retrieved other information;

one or more instructions which, when executed by the device, cause the device to receive another input from the user based on providing the portion of the retrieved other information; and one or more instructions which, when executed by the device, cause the device to cause the action to be performed when the other input indicates that the portion of the retrieved other information is accurate.

17. The non-transitory computer-readable medium of claim 16, the instructions further comprising:

one or more instructions which, when executed by the device, cause the device to prompt the user for information when searching the memory does not return a result;

one or more instructions which, when executed by the device, cause the device to receive information from the user based on prompting the user, where the received information includes identification information associated with the user; and one or more instructions which, when executed by the device, cause the device to search the memory based on the received information to obtain information relating to the user.

18. The non-transitory computer-readable medium of claim 16, where the one or more instructions to cause the action to be performed include:

one or more instructions which, when executed by the device, cause the device to retrieve, based on the portion of the information, additional information when the portion of the retrieved information is accurate; and one or more instructions which, when executed by the device, cause the device to provide a portion of the additional information to the user.

19. The non-transitory computer-readable medium of claim 16, the instructions further comprising:

one or more instructions which, when executed by the device, cause the device to retrieve additional information;

one or more instructions which, when executed by the device, cause the device to obtain a plurality of speech recognition results based on additional input from the user;

one or more instructions which, when executed by the device, cause the device to weight each of the plurality of speech recognition results, based on a match between the additional information and a respective one of the plurality of speech recognition results, to obtain a weight of each of the plurality of speech recognition results; and one or more instructions which, when executed by the device, cause the device to determine that the additional input corresponds to a particular speech recognition result, of the plurality of speech recognition results, based on the weight of the particular speech recognition result.

20. The non-transitory computer-readable medium of claim 16, where the one or more instructions to cause the action to be performed include:

one or more instructions which, when executed by the device, cause the device to receive additional information from the user; and one or more instructions which, when executed by the device, cause the device to cause the retrieved information to be updated based on the received additional information.

* * * * *